United States Patent
Ramirez-Gutierrez et al.

(10) Patent No.: US 12,166,616 B2
(45) Date of Patent: Dec. 10, 2024

(54) SWITCHING WAVEFORMS FOR UPLINK TRANSMISSION IN NR NETWORK

(71) Applicant: Telefonaktiebolaget LM Ericsson (publ), Stockholm (SE)

(72) Inventors: Raymundo Ramirez-Gutierrez, Lund (SE); Ali Nader, Malmö (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 467 days.

(21) Appl. No.: 17/636,986

(22) PCT Filed: Sep. 2, 2020

(86) PCT No.: PCT/EP2020/074439
§ 371 (c)(1),
(2) Date: Feb. 21, 2022

(87) PCT Pub. No.: WO2021/047973
PCT Pub. Date: Mar. 18, 2021

(65) Prior Publication Data
US 2022/0376965 A1    Nov. 24, 2022

Related U.S. Application Data

(60) Provisional application No. 62/897,963, filed on Sep. 9, 2019.

(51) Int. Cl.
*H04L 27/26* (2006.01)
*H04W 72/044* (2023.01)
*H04W 72/23* (2023.01)

(52) U.S. Cl.
CPC ...... *H04L 27/2636* (2013.01); *H04L 27/2605* (2013.01); *H04W 72/044* (2013.01); *H04W 72/23* (2023.01)

(58) Field of Classification Search
CPC ............ H04L 27/2636; H04L 27/2605; H04L 27/2628; H04L 5/0091; H04L 27/0008;
(Continued)

(56) References Cited

U.S. PATENT DOCUMENTS

| | | | |
|---|---|---|---|
| 10,523,358 B1* | 12/2019 | Park | H04B 7/0686 |
| 2018/0279292 A1* | 9/2018 | Luo | H04L 5/001 |
| 2018/0332542 A1* | 11/2018 | Wang | H04L 5/0007 |
| 2019/0132110 A1 | 5/2019 | Zhou et al. | |
| 2019/0173640 A1* | 6/2019 | Luo | H04L 27/2613 |
| 2019/0253122 A1* | 8/2019 | Yang | H04B 7/04 |

(Continued)

FOREIGN PATENT DOCUMENTS

| | | | | |
|---|---|---|---|---|
| EP | 3522471 A1 | 8/2019 | | |
| WO | WO-2018019385 A1 * | 2/2018 | | H04L 25/0204 |

(Continued)

OTHER PUBLICATIONS

Dahlman, E. et al., "Chapter 9 Transport-Channel Processing", pp. 160-163, "Chapter 10 Physical-Layer Control Signaling", pp. 212-213, 5G NR The next generation wireless access technology, 2018, Academic Press.
(Continued)

*Primary Examiner* — Afshawn M Towfighi
(74) *Attorney, Agent, or Firm* — COATS & BENNETT, PLLC

(57) ABSTRACT

Methods and apparatus are provided for switching a waveform for UL transmissions in a communication network to optimize power usage of the UE. In exemplary embodiments, the UE can use either CP-OFDM waveform or DFT-S-OFDM waveform for UL transmissions. A mechanism is provided to prevent excessive switching in environments where the channel conditions are rapidly changing. Further, a signaling mechanism is provided for switching waveforms for UL transmissions using Layer 1 (L1) signaling to reduce the transmission time needed to switch between CP-OFDM and DFT-S-OFDM waveforms.

20 Claims, 15 Drawing Sheets

(58) Field of Classification Search
CPC . H04L 27/2602; H04L 1/0003; H04L 1/0025; H04L 1/0026; H04L 1/0015; H04W 72/044; H04W 72/23; Y02D 30/70; H04B 7/0404; H04B 7/0689
See application file for complete search history.

(56) References Cited

U.S. PATENT DOCUMENTS

| | | | |
|---|---|---|---|
| 2019/0306923 A1* | 10/2019 | Xiong | H04J 13/0062 |
| 2020/0037254 A1* | 1/2020 | Comsa | H04W 52/367 |
| 2022/0376965 A1* | 11/2022 | Ramirez-Gutierrez | H04W 72/23 |

FOREIGN PATENT DOCUMENTS

| | | |
|---|---|---|
| WO | 2018229736 A1 | 12/2018 |
| WO | 2019160493 A1 | 8/2019 |

OTHER PUBLICATIONS

Mediatek Inc., "WP Switching Delay", 3GPP TSG-RAN WG4 Meeting #87, May 21-25, 2018, pp. 1-7, Busan, Korea, R4-1806543.

3rd Generation Partnership Project, "Technical Specification Group Radio Access Network; NR; Radio Resource Control (RRC) protocol specification (Release 15)", 3GPP TS 38.331 V15.6.0, Jun. 2019, pp. 1-499.

3rd Generation Partnership Project, "Technical Specification Group Radio Access Network; NR; User Equipment (UE) radio transmission and reception; Part 1: Range 1 Standalone (Release 16)", 3GPP TS 38.101-1 V16.0.0, Jun. 2019, pp. 1-243.

Nokia et al., "NR-U enhancements for uplink signals and channels", 3GPP TSG RAN WG1 #98, Aug. 26-30, 2019, pp. 1-14, Prague, Czech Republic, R1-1908684.

Intel Corporation, "Considerations on waveform selection for new radio interface", 3GPP TSG RAN WG1 Meeting #84bis, Apr. 11-15, 2016, pp. 1-5, Busan, South Korea, R1-162384.

* cited by examiner

SWITCHING WAVEFORMS FOR UPLINK TRANSMISSION IN NR NETWORK

RELATED APPLICATIONS

This application claims priority to U.S. Application No. 62/897,676, filed 9 Sep. 2019, and U.S. Application No. 62/897,963, filed 9 Sep. 2019, the entire disclosure of each being hereby incorporated by reference herein.

TECHNICAL FIELD

The present disclosure relates generally to uplink transmissions in a wireless communication network and, more particularly, to dynamic switching between waveforms for uplink transmissions in NR networks.

BACKGROUND

Long Term Evolution (LTE) networks use cyclic prefix orthogonal frequency division multiplexing (CP-OFDM) for downlink (DL) transmission and discrete Fourier transform spread OFDM (DFT-S-OFDM) for uplink (UL) transmission. On the other hand, New Radio (NR) networks employ CP-OFDM for DL as in LTE and both CP-OFDM and DFT-S-OFDM for UL.

Having symmetry between DL and UL transmission schemes provides simplification on the overall design, especially with respect to the wireless backhaul and device-to-device communications. Additionally, NR has the option to use DFT-S-OFDM for UL transmission, which is beneficial in coverage-limited scenarios, but is limited to single transmission layer transmission only and has a lower peak-to-average power ratio (PAPR)/cubic metric than CP-OFDM for power reduction purposes. CP-OFDM, in contrast, can support up to four transmission layers, which helps to achieve higher data rates. The low PAPR/cubic metric in DFT-S-OFDM, however, is beneficial for UE power consumption. Other DFT-S-OFDM restrictions imply that only contiguous allocations in the frequency domain can be scheduled for the UE in the UL, so DFT-S-OFDM is less flexible in terms of resource utilization and scheduling.

In practice, a 5G NodeB (gNB) can select between CP-OFDM or DFT-S-OFDM and the user equipment (UE) should be capable to support both. However, the switching between these different waveforms is complex, involving both radio resource control (RRC) configuration and DL control information (DCI) format changes.

Table 1 shows the maximum power reduction (MPR) for different modulation schemes and different carrier bandwidths (BWs).

TABLE 1

| MPR for CP-OFDM and DT-S-OFDM | | | |
| --- | --- | --- | --- |
| | | Channel Bandwidth/MPR | |
| | | 50/100/200 MHz | 400 MHz |
| DFT-s-OFDM | Pi/2 BPSK | 1.5 | 3.0 |
| | QPSK | 1.5 | 3.0 |
| | 16QAM | 3 | 4.5 |
| | 64QAM | 5 | 6.5 |
| CP-OFDM | QPSK | 3.5 | 5 0 |
| | 16QAM | 5 | 6.5 |
| | 64QAM | 7.5 | 9.0 |

As seen in Table 1, the transmission power gain obtained from DFT-S-OFDM is about 2 to 2.5 dB. This power gain is the reason of DFT-S-OFDM is beneficial for coverage or power-limited scenarios. On the other hand, CP-OFDM can transmit on multiple transmission layers, making it beneficial in scenarios where power constraints are not an issue.

For UL transmissions using CP-OFDM, the total transmitted power is equally divided between each of the available layers. The maximum number of layers used by a user equipment (UE) in the UL is configured by the network (NW) via a semi-static RRC parameter even though the number of layers to use is highly dependent on fast changing channel conditions. For example, the maximum number of UL layers in NR is four and can be fully used when the channel conditions are good. In this case, the total UE transmitted power would be divided by four and allocated to each of the layers. But when the channel conditions change for the worse (e.g., when the UE approaches a cell edge), it may be possible that only a single transmission layer can be used. In this case, the total transmitted power for the single transmission layer is still one fourth of the total transmit power due to the maximum number of layers configured by the network so the total available transmit power is not fully utilized, which could lead inefficient use of resources due to higher error rates and more retransmissions.

Radio conditions can change rapidly and RRC reconfiguration can take a relatively long time, typically in the order of 30 to 40 msec. During the RRC reconfiguration, the UE is unable to transmit or receive. Thus, frequent RRC reconfiguration in order to optimize power usage degrades performance, and in worst case scenarios, may lead to disruption of service.

SUMMARY

The present disclosure relates generally to selection of a waveform for UL transmissions in a communication network to optimize power usage of the UE. In exemplary embodiments, the UE can use either CP-OFDM or DFT-S-OFDM for UL transmissions. A mechanism is provided to prevent excessive switching in environments where the channel conditions are rapidly changing. Further, a signaling mechanism is provided for changing waveforms using Layer 1 (L1) signaling to reduce the transmission time needed to transition between CP-OFDM or DFT-S-OFDM waveforms. The techniques described herein can be used for both codebook based UL transmission and for non-codebook based UL transmission.

A first aspect of the disclosure comprises methods implemented by a base station in a wireless communication network of switching between a DFT-S-OFDM waveform and a CP-OFDM waveform for UL transmissions. In one embodiment, the base station receives, at two or more successive time instances, information from a UE indicative of channel conditions between the UE and the base station at each of the successive time instances. For each of the two or more time instances, the base station determines whether the information indicates a need for a change of the current waveform for UL transmissions. The base station maintains a first count of time instances where the information indicates a need for a change of the current waveform. The base station switches between a DFT-S-OFDM waveform on a single transmission layer and a CP-OFDM waveform on single transmission layer or multiple transmission layers depending on the first count.

According to a second aspect of the disclosure, the base station signals the change in waveform using L1 signaling.

According to this aspect, the base station configures a first bandwidth part (BWP) and a second BWP on UL resources used for UL transmissions from a UE to a base station. The base station configures a UE to operate in the first BWP using a DFT-S-OFDM waveform on a single transmission layer, and to operate in the second BWP using a CP-OFDM waveform on a single transmission layer or multiple transmission layers. After configuring the UE, the base station receives information from the UE indicative of channel conditions between the UE and the base station. The base station evaluates, based on the information from the UE, whether to switch between the DFT-S-OFDM waveform and the CP-OFDM waveform for UL transmissions. If it is determined that a change in waveform is needed, the base station sends to the UE, responsive to the evaluation, DCI over the DL control channel. The DCI includes an indication of the BWP associated with a target waveform selected from among the DFT-S-OFDM waveform and the CP-OFDM waveform.

A third aspect of the disclosure comprises methods implemented by a UE capable of multi-layer transmission of switching between a DFT-S-OFDM waveform and a CP-OFDM waveform for UL transmissions. The UE configures a first bandwidth part (BWP) and a second BWP on UL resources used for UL transmissions from the UE to a base station. The UE configures the first BWP for a DFT-S-OFDM waveform using a single transmission layer for UL transmissions and configures the second BWP for a CP-OFDM waveform on a single transmission layer or multiple transmission layers for UL transmissions. The UE further sends, to a base station, information from which channel conditions between the UE and the base station can be determined. The UE thereafter receives, from the base station, DCI over the DL control channel. The DCI includes an indication of the BWP associated with a target waveform selected from among the DFT-S-OFDM waveform and the CP-OFDM waveform based on the information. Responsive to the BWP indication, the UE switches from a current BWP to the target BWP responsive to the BWP indication.

A fourth aspect of the disclosure comprises a base station configured to switch between a DFT-S-OFDM waveform and a CP-OFDM waveform for UL transmissions. The base station comprises one or more antennas, a receiving unit, a determining unit, a counting unit and a switching unit. The receiving unit is configured to receive, at two or more successive time instances, information from a UE indicative of channel conditions between the UE and the base station at each of the successive time instances. The determining unit is configured to, for each of the two or more time instances, determine whether the information indicates a need for a change of the current waveform for UL transmissions. The counting unit is configured to maintain a first count of time instances where the information indicates a need for a change of the current waveform. The switching unit is configured to switch between a DFT-S-OFDM waveform on a single transmission layer and a CP-OFDM waveform on a single transmission layer or multiple transmission layers depending on the first count.

A fifth aspect of the disclosure comprises a base station configured to switch between a DFT-S-OFDM waveform and a CP-OFDM waveform for UL transmissions. The base station comprises one or more antennas, a BWP configuring unit, a first waveform configuring unit, a second waveform configuring unit, a receiving unit, an evaluation unit and a DCI sending unit. The BWP configuring unit is operative to configure a first bandwidth part (BWP) and a second BWP on UL resources used for UL transmissions from a UE to a base station. The first waveform configuring unit is operative to configure a UE to operate in the first BWP using a DFT-S-OFDM waveform on a single transmission layer. The second waveform configuring unit is operative to configure the UE to operate in the second BWP using a CP-OFDM waveform on a single transmission layer or multiple transmission layers. The receiving unit is configured to receive information from a UE indicative of channel conditions between the UE and the base station. The evaluation unit is configured to evaluate, based on the information from the UE, whether to switch between the DFT-S-OFDM waveform and the CP-OFDM waveform for UL transmissions. The DCI configuring unit is configured to send to the UE, responsive to the evaluation, DCI over the DL control channel. The DCI includes an indication of the BWP associated with a target waveform selected from among the DFT-S-OFDM waveform and the CP-OFDM waveform.

A sixth aspect of the disclosure comprises a UE capable of multi-layer transmission configured to switch between a DFT-S-OFDM waveform and a CP-OFDM waveform for UL transmissions. The UE comprises one or more antennas, a BWP configuring unit, a first waveform configuring unit, a second waveform configuring unit, a sending unit, a receiving unit, and a switching unit. The BWP configuring unit configures a first bandwidth part (BWP) and a second BWP on UL resources used for UL transmissions from the UE to a base station. The first waveform configuring unit is operative to configure the first BWP for a DFT-S-OFDM waveform using a single transmission layer. The second waveform configuring unit is operative to configure the second BWP for a CP-OFDM waveform on a single transmission layer or multiple transmission layers. The sending unit is configured to send, to a base station, information from which channel conditions between the UE and the base station can be determined. The receiving unit is configured to receive, from the base station, DCI over the DL control channel, The DCI includes an indication of the BWP associated with a target waveform selected from among the DFT-S-OFDM waveform and the CP-OFDM waveform based on the information. The switching unit is configured to switch from a current BWP to the target BWP responsive to the BWP indication.

A seventh of the disclosure comprises a base station configured to perform the method according to the first and second aspects. The base station comprises interface circuitry for communicating with a UE over a wireless communication channel and processing circuitry. In one embodiment, the processing circuitry is configured to receive, at two or more successive time instances, information from a UE indicative of channel conditions between the UE and the base station at each of the successive time instances. The processing circuitry is further configured to, for each of the two or more time instances, determine whether the information indicates a need for a change in the current waveform used for UL transmission. The processing circuitry is further configured to maintain a first count of time instances where the information indicates a need for a change in the current waveform, and to switch between a DFT-S-OFDM waveform on a single transmission layer and a CP-OFDM waveform on a single transmission layer or multiple transmission layers depending on the first count.

An eighth of the disclosure comprises a base station configured to perform the method according to the first and second aspects. The base station comprises interface circuitry for communicating with a UE over a wireless communication channel and a processing circuitry. The processing circuitry is operative to configure a first bandwidth part (BWP) and a second BWP on UL resources used for UL transmissions from a UE to a base station. The processing circuitry is further operative to configure a UE to operate in the first BWP using a DFT-S-OFDM waveform on a single transmission layer, and to configure the UE to operate in the second BWP using a CP-OFDM waveform on a single transmission layer or multiple transmission layers. The processing circuitry is configured to receive information from a UE indicative of channel conditions between the UE and the base station and to evaluate, based on the received information, whether to switch between the DFT-S-OFDM waveform and the CP-OFDM waveform for UL transmissions. The processing circuitry is further configured to send to the UE, responsive to the evaluation, DCI over the DL control channel. The DCI includes an indication of the BWP associated with a target waveform selected from among the DFT-S-OFDM waveform and the CP-OFDM waveform.

A ninth of the disclosure comprises a UE configured to perform the method according to the first and second aspects. The UE comprises interface circuitry for communicating with a base station over a wireless communication channel and a processing circuitry. The processing circuitry is operative to configure a first bandwidth part (BWP) and a second BWP on UL resources used for UL transmissions from the UE to a base station. The processing circuitry is further operative to configure the UE to operate in the first BWP using a DFT-S-OFDM waveform on a single transmission layer, and to configure the UE to operate in the second BWP using a CP-OFDM waveform on a single transmission layer or multiple transmission layers. The processing circuitry is further configured to send, to a base station, information from which channel conditions between the UE and the base station can be determined. The processing circuitry is further configured to receive, from the base station, DCI over the DL control channel. The DCI includes an indication of the BWP associated with a target waveform selected from among the DFT-S-OFDM waveform and the CP-OFDM waveform based on the information. The processing circuitry is further configured to switch from a current BWP to the target BWP responsive to the BWP indication. The processing circuitry is further configured to, responsive to the BWP indication, switches from a current BWP to the target BWP responsive to the BWP indication.

A tenth of the disclosure comprises a computer program product comprising executable instructions that configure a processing circuitry in a base station to perform the method according to the first aspect. The computer program product can be embodied in a carrier, such as an electronic signal, optical signal, radio signal, or computer readable storage medium.

An eleventh aspect of the disclosure comprises a computer program product comprising executable instructions that configure a processing circuitry in a base station to perform the method according to the second aspect. The computer program product can be embodied in a carrier, such as an electronic signal, optical signal, radio signal, or computer readable storage medium.

A twelfth aspect of the disclosure comprises a computer program product comprising executable instructions that configure a processing circuitry in a UE to perform the method according to the third aspect. The computer program product can be embodied in a carrier, such as an electronic signal, optical signal, radio signal, or computer readable storage medium.

DETAILED DESCRIPTION

Figure 1:
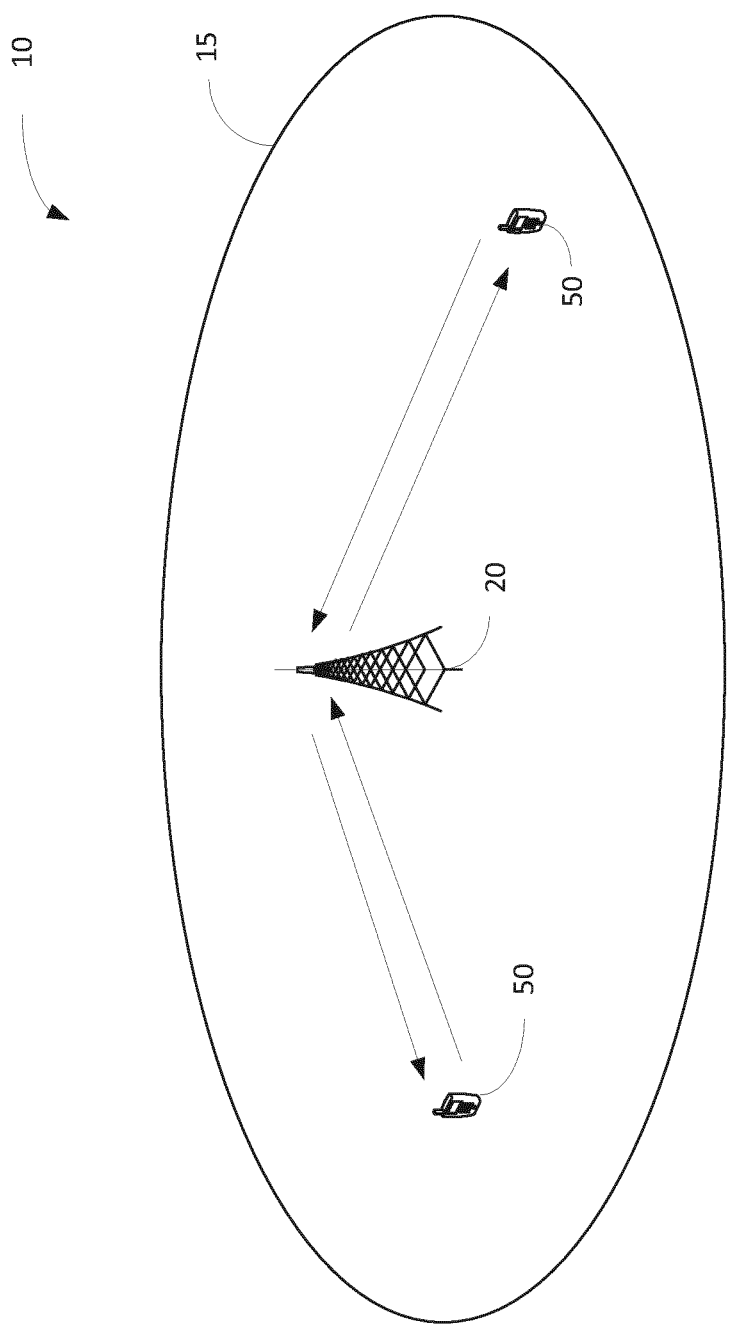
FIG. 1 illustrates a wireless communication network according to an embodiment.

Referring now to the drawings, an exemplary embodiment of the disclosure will be described in the context of a 5G or NR wireless communication network. Those skilled in the art will appreciate that the methods and apparatus herein described are not limited to use in 5G or NR networks, but may also be used in wireless communication networks where multiple beams within a single cell are used for communication with wireless devices in the cell.

FIG. 1 illustrates a wireless communication network 10 according to the NR standard currently being developed by Third Generation Partnership Project (3GPP). The wireless communication network 10 comprises one or more base stations 20 providing service to user equipment (UEs) 50 in respective cells 15 of the wireless communication network 10. The base stations 20 are also referred to as Evolved NodesBs (eNBs) and gNodeBs (gNBs) in 3GPP standards. Although only one cell 15 and one base station 20 are shown in FIG. 1, those skilled in the art will appreciate that a typical wireless communication network 10 comprises many cells 15 served by many base stations 20.

The UEs 50 may comprise any type of equipment capable of communicating with the base station 20 over a wireless communication channel. For example, the UEs 50 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

NR networks employ CP-OFDM for DL as in LTE and both CP-OFDM and DFT-S_OFDM for UL. In the case that CP-OFDM is selected for UL transmissions, the UE 50 can transmit on up to four layers. In the case that DFT-S-OFDM is selected for UL transmissions, the UE 50 can transmit on a single transmission layer only. The maximum number of layers is configured by RRC and the transmit power of the UE 50 is divided equally between all layers based on the configured maximum number of layers. If more than one layer is configured by RRC, the full transmit power of the UE 50 is used only in when transmitting on the allowed maximum number of layers.

Radio conditions can change rapidly and RRC reconfiguration can take a relatively long time, typically in the order of 30 to 40 msec. During this delay, a UE 50 is not expected to receive DL signals or transmit UL signals until the new RRC configuration is concluded. While switching between DFT-S-OFDM and CP-OFDM enables the UE to make more optimal use of its available power, switching too frequently may cause noticeable degradation in performance.

Figure 2:
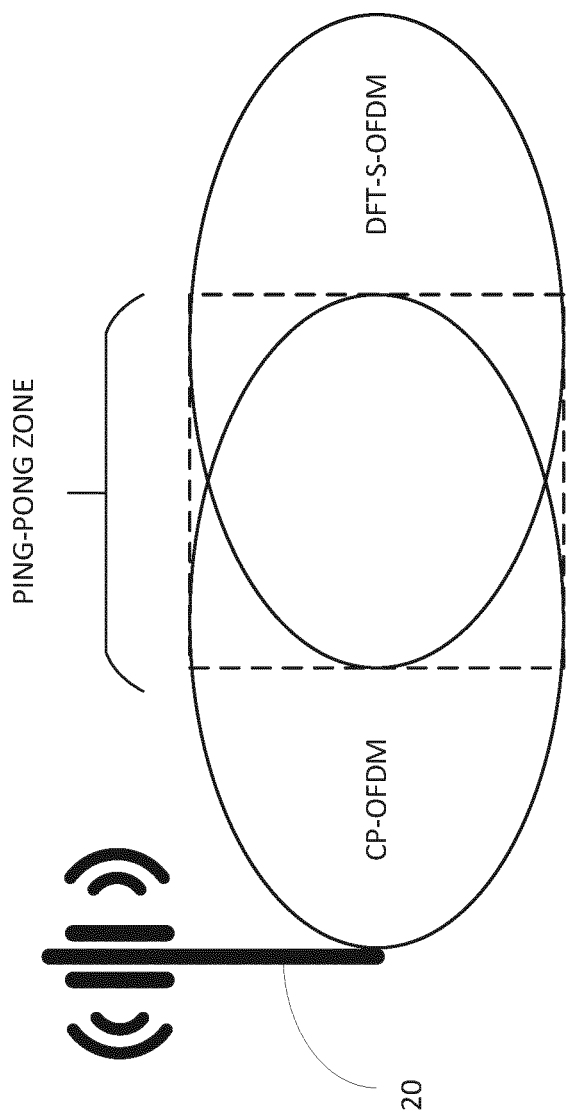
FIG. 2 illustrates a ping-pong zone in a wireless communication network where channel conditions are changing frequently.

FIG. 2 illustrates the areas where DFT-S-OFDM and CP-OFDM typically are used. When the UE 50 is close to the base station 10, referred to herein as the near zone, channel conditions are likely to be good so that CP-OFDM and a single transmission layer or multiple transmission layers can be used for UL transmission. On the other hand, when the UE 50 is located far away from the base station 20, referred to herein as the far zone, channel conditions are likely to be poor in comparison to the near zone so that DFT-S-OFDM and a single transmission layer is used for UL transmission. Between these two zones is an intermediate zone, referred to herein as the ping-pong zone, where channel conditions change frequently causing frequent RRC reconfigurations. The frequent switching between DFT-S-OFDM using a single transmission layer and CP-OFDM using a single transmission layer or multiple transmission layers increases the time the UE 50 is unable to transmit or receive signals, degrading performance and, in worse case scenarios, resulting in link failure.

One aspect of the present disclosure comprises techniques to avoid ping-ponging between DFT-S-OFDM using a single transmission layer and CP-OFDM using a single transmission layer or multiple transmission layers when a UE 50 is an area with frequently changing channel conditions (e.g., ping-pong zone). To avoid repeated and frequent switching (i.e., ping-ponging) between waveforms, the switching logic is modified to introduce hysteresis into the decision process for link adaptation. Conventionally, the base station 20 monitors the channel conditions between the UE 50 and the base station 20 and determines when to change waveforms based on the channel conditions. Other factors may also be considered such as the power headroom of the UE, buffer status of the UE, battery status of the UE, temperature of the UE, etc. In embodiments of the present disclosure, the base station 20 avoids ping-ponging in scenarios where the channel conditions are frequently changing by delaying the change in the waveform after the change in the channel conditions is detected. For example, after detecting a change in the channel conditions necessitating a change in the waveform used for UL transmissions, the base station 20 may delay the change in the waveform during a time window while it continues to monitor the channel conditions. If the channel conditions requiring the change in waveform dominate or prevail during this time window, the base station 20 instructs the UE 50 to change the waveform. On the other hand, if the channel conditions change back before the end of the time window, the base station 20 will continue using the current waveform.

In some embodiments, the channel conditions on the UL can be determined based on periodic link adaptation reports from the UE. The periodic LA reports may contain channel state information indicating conditions of the DL channel. In other embodiments, the channel conditions are determined from sounding reference signals (SRSs) transmitted by the UE on the UL.

An exemplary embodiment of the decision logic for link adaptation is described below for purposes of illustrating the principles of the present disclosure. Those skilled in the art will appreciate that this example is not intended to be limiting. In this example, it is assumed that CP-OFDM may be configured for a maximum of two transmission layers, while DFT-S-OFDM uses only a single transmission layer. Additionally, it is assumed that the UE 50 has or supports only two antenna ports.

Figure 3:
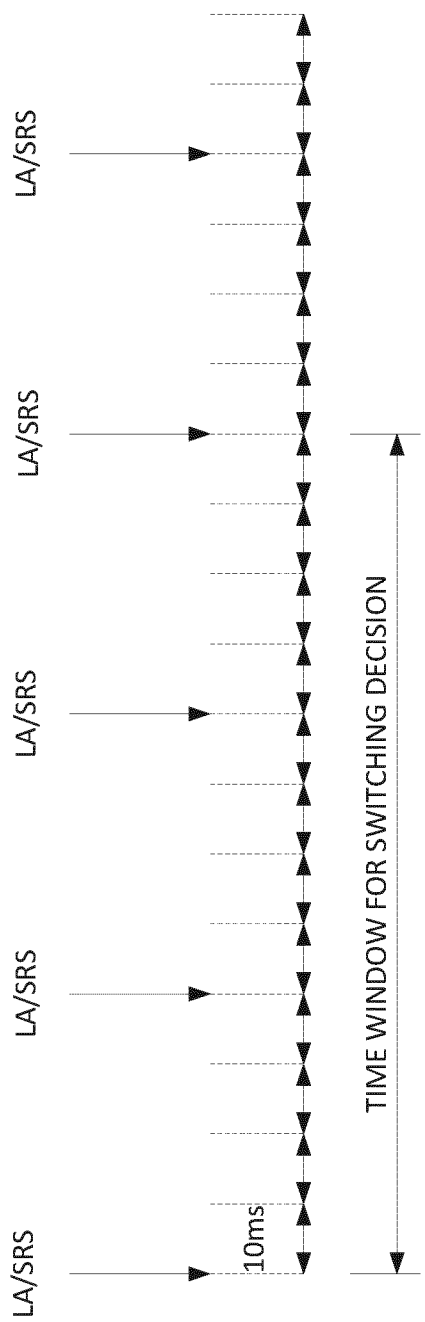
FIG. 3 illustrates a time window for link adaptation.
Figure 4:
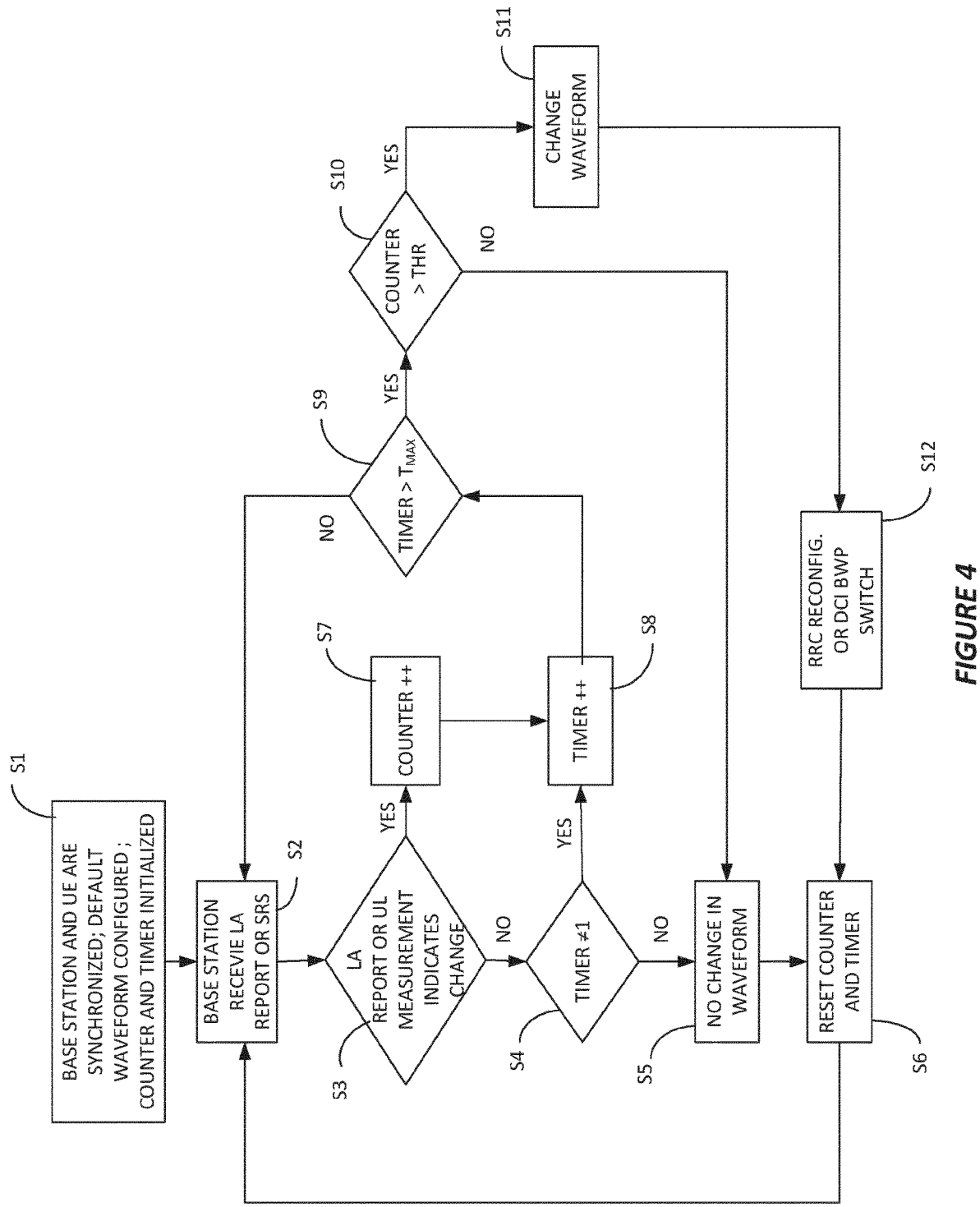
FIG. 4 illustrates an exemplary procedure for switching between DFT-S-OFDM and CP-OFDM.

FIG. 4 illustrates an exemplary procedure for link adaptation according to one example. The procedure uses a counter, referred to herein as a change counter, and a timer that defines the length of a time window. The time window, shown in FIG. 3, defines the maximum number of time instances that will be considered for changing waveforms and introduces a time delay. The time window is flexible to any desired report periodicity or number of reports. In this example, a time window of 120 msec is used to avoid switching back and forth between DFT-S-OFDM and CP-OFDM.

After the base station 20 and UE 50 are synchronized, a default waveform is selected, and the change counter and timer are initialized to starting values, which in this example is "0" for the counter and "1" for the timer (S1). In the example below, time is measured as a number of time intervals, which may comprise a reporting interval for LA reports or measurement intervals for performing UL measurements on SRS signals.

Once the base station 20 and UE 50 are synchronized, the base station 20 begins receiving periodic link adaptation (LA) reports from the UE 50 (S2). In this example, the UE 50 sends the LA reports to the base station at 40 msec intervals. The LA reports may include, for example, one or more of Reference Signal Received Power (RSRP) measurements on DL signal transmitted by the base station 20 or other signal quality measurements, a rank indicator (RI) indicating a number of transmission layers that can be supported by the UE 50, or a precoding Matrix indicator (PMI) indicating a selected precoding matrix for the UL transmission. The LA reports provide the base station 20 with information about the DL channel conditions. Assuming reciprocity, (e.g., for example in Time Division Duplex (TDD) systems), the channel conditions on the UL are assumed to be the same, or at least close. In this case, the decision to change waveforms is based on the LA reports.

Alternatively, the UE 50 may send SRSs at periodic intervals and the base station 20 performs UL measurements on the received SRSs. The UL measurements in this case provide the base station 20 with information about the UL channel conditions when reciprocity cannot be assumed. In this case, the base station 20 receives the SRSs and performs UL measurements at a predetermined measurement interval. The decision to change waveforms is based on the UL measurements.

In some embodiments, both LA reports and SRSs may be used to make link adaptation decisions. It will also be appreciated that channel conditions can also be determined based on other UL reference signal or demodulated signals. Thus, the procedure as herein described is adaptable to any manner of determining the current UL channel conditions.

Returning to FIG. 4, when a LA report or SRS is received from the UE 50, the base station 20 evaluates the LA reports and/or UL measurements on the SRS to determine whether channel conditions have changed so as to necessitate a change of the waveform (S3). If the LA reports and/or the UL measurements indicate that a change is needed, the base station 20 does not necessarily change waveforms immediately. Instead, the base station 20 will wait for a predetermined time period defined by the time window to make the decision to change the waveform for UL transmissions. If a predetermined number of successive LA reports or UL measurements provide a change indication within the time window, the base station 20 makes the decision to change waveforms (S10). When the LA report or UL measurement provides a change indication, the base station 20 increments the change counter (S7) and activates or increments a timer (S8) that defines the time window. The base station 20 compares the timer value to a predetermined maximum value (S9). In this example, the timer measures time by the number of reporting intervals for LA reports or measurement intervals for UL measurements. If the timer value is less than or equal to the maximum timer value, the base station 20 waits for the next LA report or UL measurement. If the timer value is greater than the predetermined maximum value, the base station 20 compares the value of the change counter to a threshold T (S10). If the counter value is less than or equal to the threshold T, the waveform is not changed the changed (S5). In the case, the base station resets the counter and timer to their starting values (S6) and waits for the next LA report or SRS. If the counter value is greater than the threshold T, a decision is made to change the waveform (S11), which in some embodiments requires an RRC reconfiguration (S12). In other embodiment described in more detail below, RRC reconfiguration is avoided by preconfiguring the UL resources with at least two bandwidth parts using different RRC configurations. In this case, the base station 20 sends DL control information (DCI) to the UE 50 indicating the BWP to use for UL transmission (S12). Because the different BWPs are preconfigured, RRC reconfiguration is not required.

If, the base station 20 determines at S3 that the channel conditions have not changed so as to require a change in the waveform, the base station 20 makes a decision to continue using the current waveform (S5). In this case, the base station 20 resets the counter and timer to their initial values (S6) and waits for the next LA report or SRS transmission from the UE 50.

The effect of the procedure in FIG. 4 is to reset the counter and restart the timer every time an LA report or SRS provides a negative change indication, also referred to herein as a "no change" indication. Additionally, the counter and timer are reset upon timer expiration (e.g., every 120 msec) unless the counter value reaches the threshold T. Thus, the waveform will not be changed unless a predetermined number of consecutive LA reports or SRSs provide a change indication.

DFT-S-OFDM can be considered as "safer" or more robust than CP-OFDM due to its coverage-extension characteristic. In unfavorable channel conditions, it is likely that DFT-S-OFDM preserves the link. Additionally, DFT-S-OFDM requires less power and reduces power consumption due to its lower PAPR, which impacts positively the UE power saving. Given these benefits, some embodiments may bias operation towards DFT-S-OFDM so that the UE 100 operates most of the time using DFT-S-OFDM and switches to CP-OFDM only under good channel conditions.

Table 2 below provides one example of initial counter and timer values depending on the current transmission waveform.

TABLE 2

Initial Counter and Timer Values

| Current TX Mode | Counter | Timer | Threshold |
| --- | --- | --- | --- |
| DFT-S-OFDM | 0 | 1 | 2 |
| CP-OFDM | 2 | 1 | 2 |

In the example shown in Table 2, the counter is initialized to a value of 0 when the current waveform is DFT-S-OFDM using a single transmission layer and to a value of 2 when the current waveform is CP-OFDM using a single transmission layer or multiple transmission layers. In both cases the timer is initialized to 1 and the time window is assumed to be 120 msec. Also, the threshold T is set to a value of 2 for both waveforms. In this example, the base station 20 will not change from DFT-S-OFDM to CP-OFDM unless 3 consecutive LA reports or SRSs provide a change indication. That is, after receiving the first change indication after a counter reset, the base station 20 waits to receive 2 additional change indications (80 msec) within the time window of 120 msec. On the other hand, the base station 20 will change from CP-OFDM to DFT-S-OFDM immediately on receipt of the first LA report or SRS providing a change indication. Therefore, the change to DFT-S-OFDM has more weight than the change from DFT-S-OFDM to CP-OFDM. This behavior is beneficial in environments with rapidly changing channel conditions.

According to another aspect of the disclosure, method and apparatus are provided for dramatically reducing the transition time for switching between DFT-S-OFDM using a single transmission layer to CP-OFDM configured for a single transmission layer or multiple transmission layers. The reduction in transition time is achieved by configuring the UL resources with two or more BWPs.

In NR, BWPs were introduced in Release-15. A UE 50 can operate on a single BWP per serving cell at a time, and switch among multiple BWPs. Currently, up to 4 BWPs can be defined for both UL and DL. A BWP configuration contains not only RF parameters (bandwidth and frequency location of BWP, numerology and CP), but also a list of parameters for physical channels, signals and scheduling related configurations.

Figure 5:
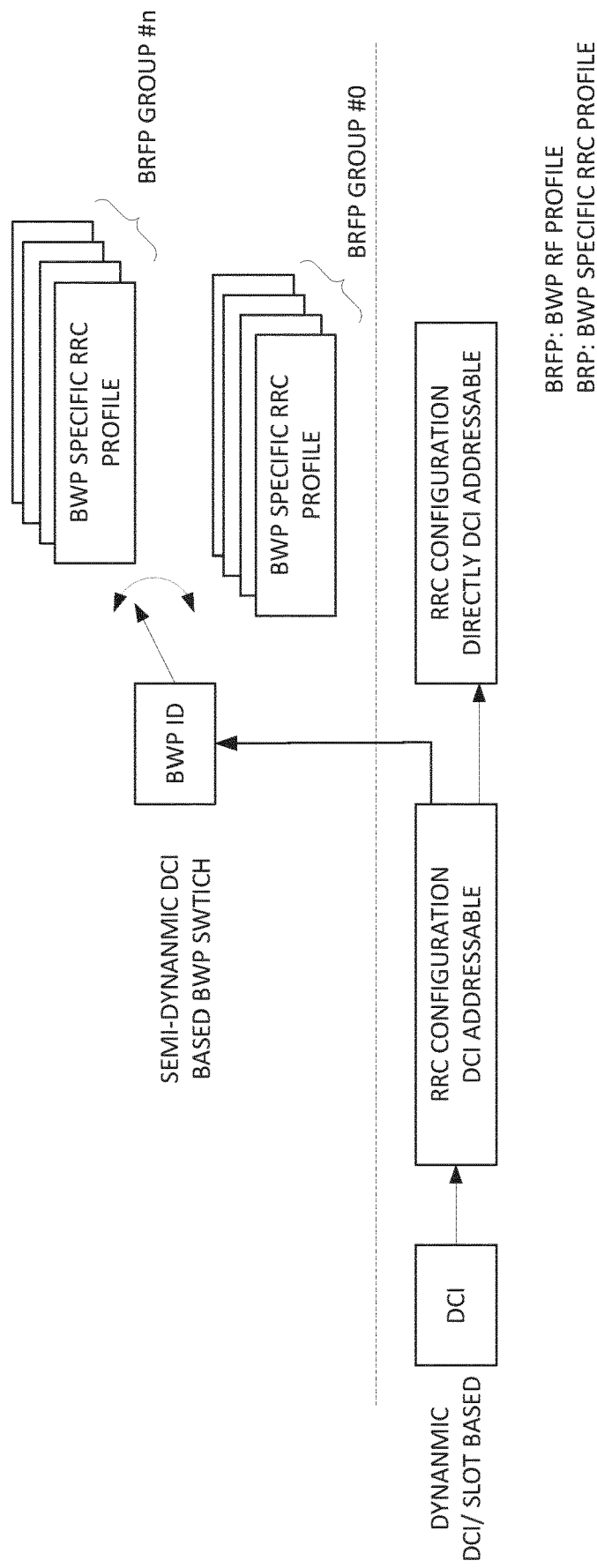
FIG. 5 illustrates DCI-based BWP switching.

Switching between BWPs can be accomplished by sending a BWP identification (ID) in DCI from the base station 20 to the UE 50 as shown in FIG. 5. BWP switching can also be RRC-based or timer-based. The present disclosure focuses on DCI-based BWP switching. Table 3 illustrates switching latency for different scenarios denoted 1-5 as described in the 3GPP contribution Discussion on BWP delay requirement, R4-1806543. This characteristic of DCI-based BWP switching can be taken advantage of in a variety of applications for the benefit of overall network performance where inferior performance is caused by slow RRC reconfiguration. The scenarios best fitted the present disclosure is scenario 5, where the switching delay is 2 msec.

TABLE 3

Switching Delay for DCI-Based BWP Switching

| Triggering Type | UE Type | Scenario | Delay (msec) | Total (in slot) | | | |
|---|---|---|---|---|---|---|---|
| | | | | 15 KHz | 30 KHz | 60 KHz | 120 KHz |
| DCI-Based | 1 | 1, 2, 3, 5 | 600 | 1 | 2 | 3 | 6 |
| | | 4 | 400 | 1 | 2 | 2 | 4 |
| | 2 | 1, 2, 3, 5 | 2000 | 3 | 5 | 9 | 18 |
| | | 4 | 950 | 2 | 3 | 5 | 8 |

In one embodiment, a first BWP, denoted BWP #0 is configured for UL transmission using a DFT-S-OFDM waveform on a single transmission layer. A second BWP, denoted BWP #1, is configured for UL transmission using a CP-OFDM waveform on a single transmission layer or multiple transmission layers. It is important to highlight that this approach uses 2 of 4 of the available BWPs. The remaining BWPs may be used for other purposes, such as power saving.

Figure 6:
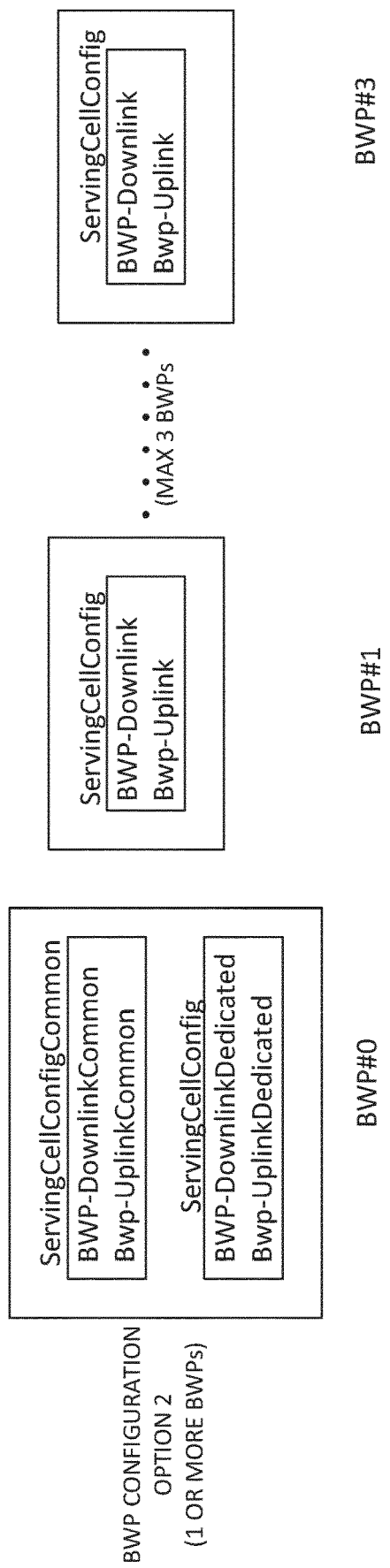
FIG. 6 illustrates BWP configurations for multiple BWPs.

FIG. 6 illustrates the high-level configuration of the BWPs. BWP #0 is configured for the waveform that serves as a default and BWP #1 is configured for the other waveform. In one embodiment, CP-OFDM is used as a default waveform because DFT-S-OFDM is a UE capability and some UEs may not support DFT-S-OFDM. In this case, BWP #0 is configured for CP-OFDM using a single transmission layer or multiple transmission layers and BWP #1 is configured for DFT-S-OFDM using a single transmission layer. In other embodiments, DFT-S-OFDM is used as a default waveform.

Figure 7:
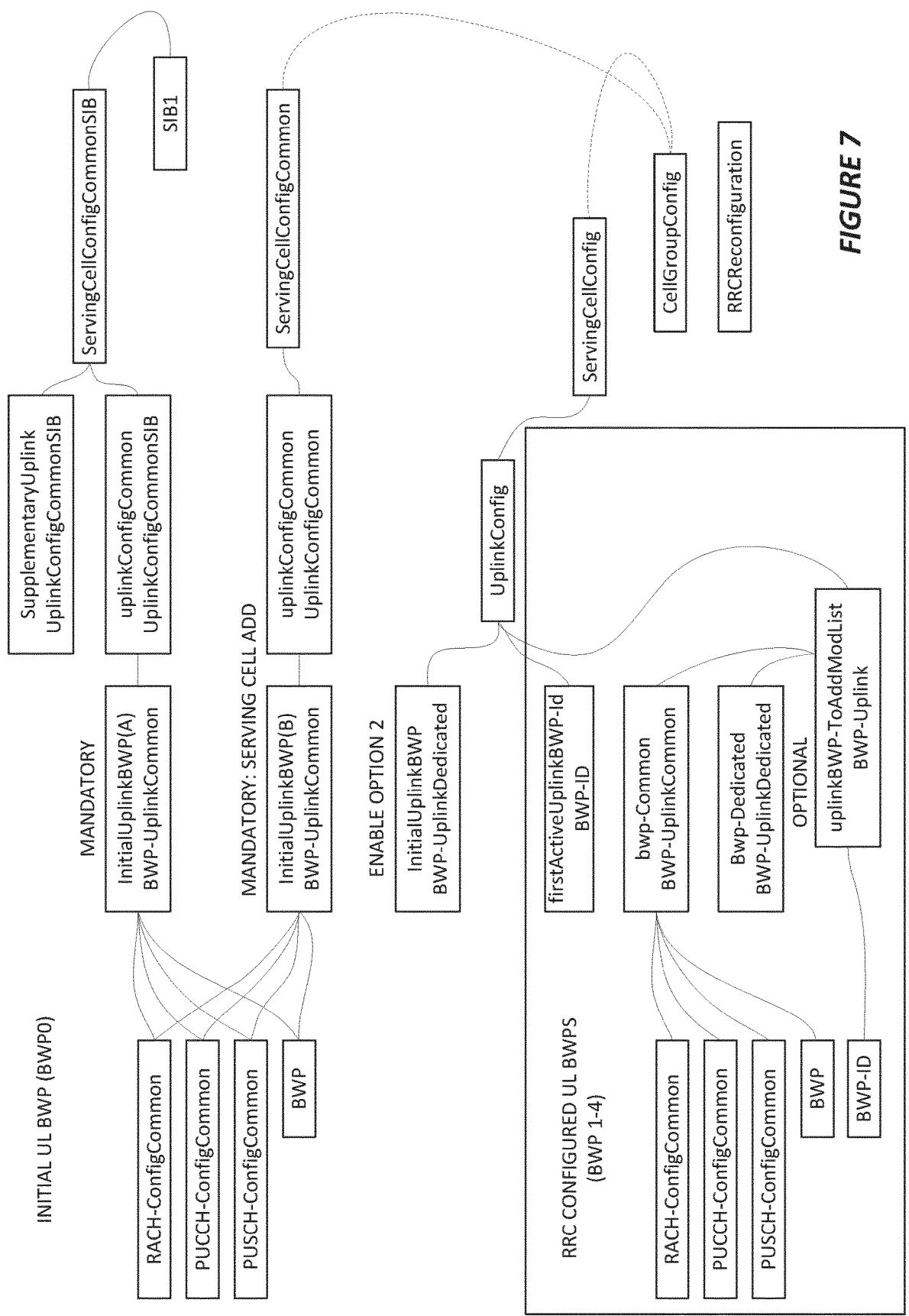
FIG. 7 illustrates common parameter configurations for BWPs.

FIG. 7 shows the RRC dependencies that are needed to configure the common part of the BWPs. It is worth noting that BWP #0 has more fields to be configured and the additional BWPs can be tailored based on the bwp-Common (parameters shared by all the BWPs) and the bwp-Dedicated (parameters to specific BWP). Thus, CP-OFDM is configured to support a single transmission layer or multiple transmission layers, maximum rank greater than 1 and multiple antenna ports for all the reference signals and DFT-S-OFDM for single transmission layer, maximum rank one and single antenna port for diverse reference signals. When DFT-S-OFDM is chosen, maximum transmitted power can be achieved for UL transmission.

As BWPs are scarce resources with a maximum of 4 in the current versions of the 3GPP specifications, it might not always be suitable to use BWPs switching so that the BWPs can be used for other purposes. For example, the BWPs may be needed for actual bandwidth change for the sake of power saving. Therefore, when the BWPs are used for other purposes, the base station 20 might chose to use the RRC Reconfiguration procedure for switching the waveform used for UL transmissions.

In the current versions of the specifications, DCI is typically accompanied with a DL assignment or UL grant. Currently, the standards do not allow for the transmission of DCI to the UE for switching BWP without a resource allocation. Therefore, in case there is no need of resource allocation for UE data traffic or control information (not counting pre-allocated resources such as PUCCH used for SRS/CSI), and the base station 20 knows based on historical info/NW internal assistance/NW external assistance/UE assistance/buffer status in UL or DL) that there will not be any data exchange in some time ahead (e.g., 100's of milliseconds), then the RRC Reconfiguration procedure can be used by the base station 20 to achieve the waveform change. Alternatively, in some embodiments, the base station 20 can allocate a small "dummy" resource in the UL just to be able to provide the DCI including the BWP indication.

In another aspect of the present disclosure, in addition to link budget, other factors may be considered in deciding whether to switch between DFT-S-OFDM and CP-OFDM. Exemplary factors to consider include power headroom, battery capacity, operating temperature, and buffer status. When the power headroom is low, the UE 10 may not be able to take advantage of multiple transmission layers. In this case, it may be preferable to switch to or remain in the DFT-S-OFDM waveform. When battery capacity is low, or overheating is detected, the UE may provide a power preference indication (PPI) or temperature indication to the base station 20. In this case, it is also preferable to switch to or remain in the DFT-S-OFDM waveform. When the UE 50 has little UL data too send, as reflected by buffer status reports (BSRs) received by the base station 20, the DFT-S-OFDM mode may be sufficient even when the UE 50 can support multiple transmission layers.

In the embodiments herein described, the borders of the ping-pong zone may be chosen such that a larger area is used for DFT-S-OFDM and thereby, the ping-pong-area is much closer to the base station. This can be realized by a weight function (as shown in Table 2), which biases the selection of the waveform. The biasing can be implemented in a dynamic matter and adjusted as the UE status changes. For example, the bias can be adjusted based on the power preference of the UE 50. A stronger bias can be applied when the UE 50 is indicates a preference for power saving and a weaker bias can be used when power saving is not indicated.

Figure 8:
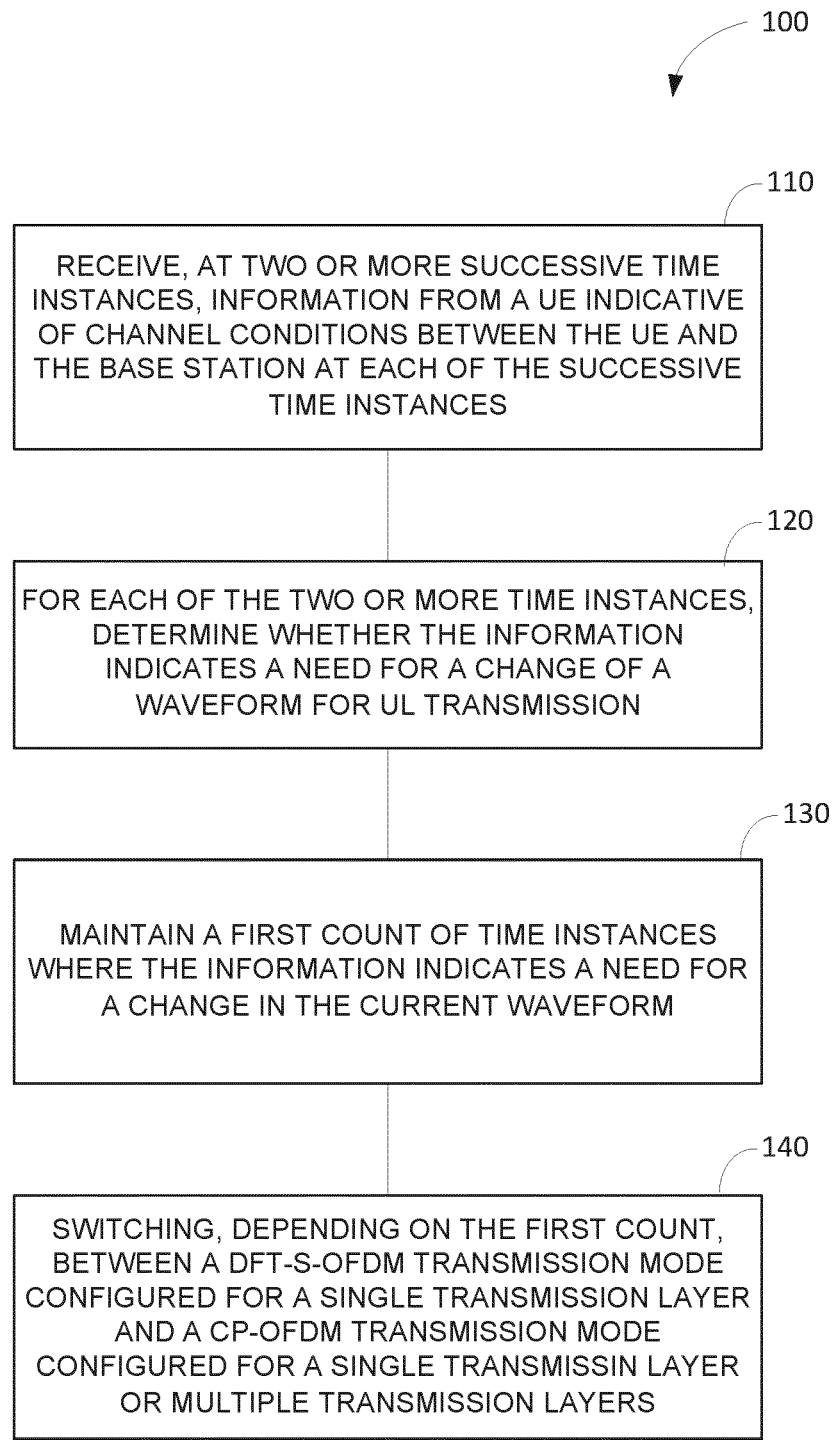
FIG. 8 illustrates an exemplary method implemented by a base station of switching between waveforms to avoid ping-ponging.

FIG. 8 illustrates an exemplary method 100 implemented by a base station 20 of switching waveforms for UL transmissions from a UE 50. In one embodiment, the base station 20 receives, at two or more successive time instances, information from a UE 50 indicative of channel conditions between the UE 50 and the base station 20 at each of the successive time instances (block 110). For each of the two or more time instances, the base station 20 determines whether the information indicates a need for a change of a current waveform for UL transmissions (block 120). The base station 20 maintains a first count of time instances where the information indicates a need for a change of the current waveform (block 130). The base station 20 switches between a DFT-S-OFDM waveform on a single transmission layer and a CP-OFDM waveform on a single transmission layer or multiple transmission layers depending on the first count (block 140).

In some embodiments of the method 100, the first count is of a number of consecutive time instances where the information indicates a need for a change of the current waveform.

In some embodiments of the method 100, switching between the DFT-S-OFDM waveform and the CP-OFDM waveform comprises switching waveforms when the first count reaches a threshold.

In some embodiments of the method 100, switching between the DFT-S-OFDM waveform and the CP-OFDM waveform when the first count reaches a threshold comprises switching from the DFT-S-OFDM waveform to the CP-OFDM waveform when the first count reaches a first threshold,; and switching from the CP-OFDM waveform to DFT-S-OFDM waveform when the first count reaches a second threshold less than the first threshold.

In some embodiments of the method 100, switching between the DFT-S-OFDM waveform and the CP-OFDM waveform comprises switching modulation waveforms when the first count reaches a threshold within a time window.

Some embodiments of the method 100 further comprise initializing a timer to measure a duration of the time window and running the timer responsive to the receipt of information indicating a need for a change of the current waveform.

Some embodiments of the method 100 further comprise resetting the timer responsive to expiration of the timer, or receipt of information indicating no change of the current waveform.

Some embodiments of the method 100 further comprise resetting the first count responsive to expiration of the timer.

Some embodiments of the method 100 further comprise maintaining a second count of time instances where the information indicates no need for a change of the current waveform.

In some embodiments of the method 100, switching between the DFT-S-OFDM waveform and the CP-OFDM waveform further depends on the second count.

In some embodiments of the method 100, switching between the DFT-S-OFDM waveform and the CP-OFDM waveform depends on a comparison of the first count and the second count.

In some embodiments of the method 100, the information comprises channel state information indicative of downlink channel conditions.

In some embodiments of the method 100, the information further includes power headroom of the UE 50.

In some embodiments of the method 100, the information further includes at least one of battery status information, a power preference indication or a temperature indication to the base station 20.

In some embodiments of the method 100, switching between a DFT-S-OFDM waveform configured for a single transmission layer and a CP-OFDM waveform configured for a single transmission layer or multiple transmission layers comprises performing Bandwidth Part (BWP) switching when BWPs are configured for waveform switching, and performing a Radio Resource Control (RRC) reconfiguration when BWPs are not configured for waveform switching.

In some embodiments of the method 100, switching between a DFT-S-OFDM waveform configured for a single transmission layer and a CP-OFDM waveform configured for a single transmission layer or multiple transmission layers comprises performing a Radio Resource Control (RRC) reconfiguration when no data exchange requiring a resource assignment is expected within a predetermined time period, and performing Bandwidth Part (BWP) switching when a data exchange requiring a resource assignment is expected within a predetermined time period.

Figure 9:
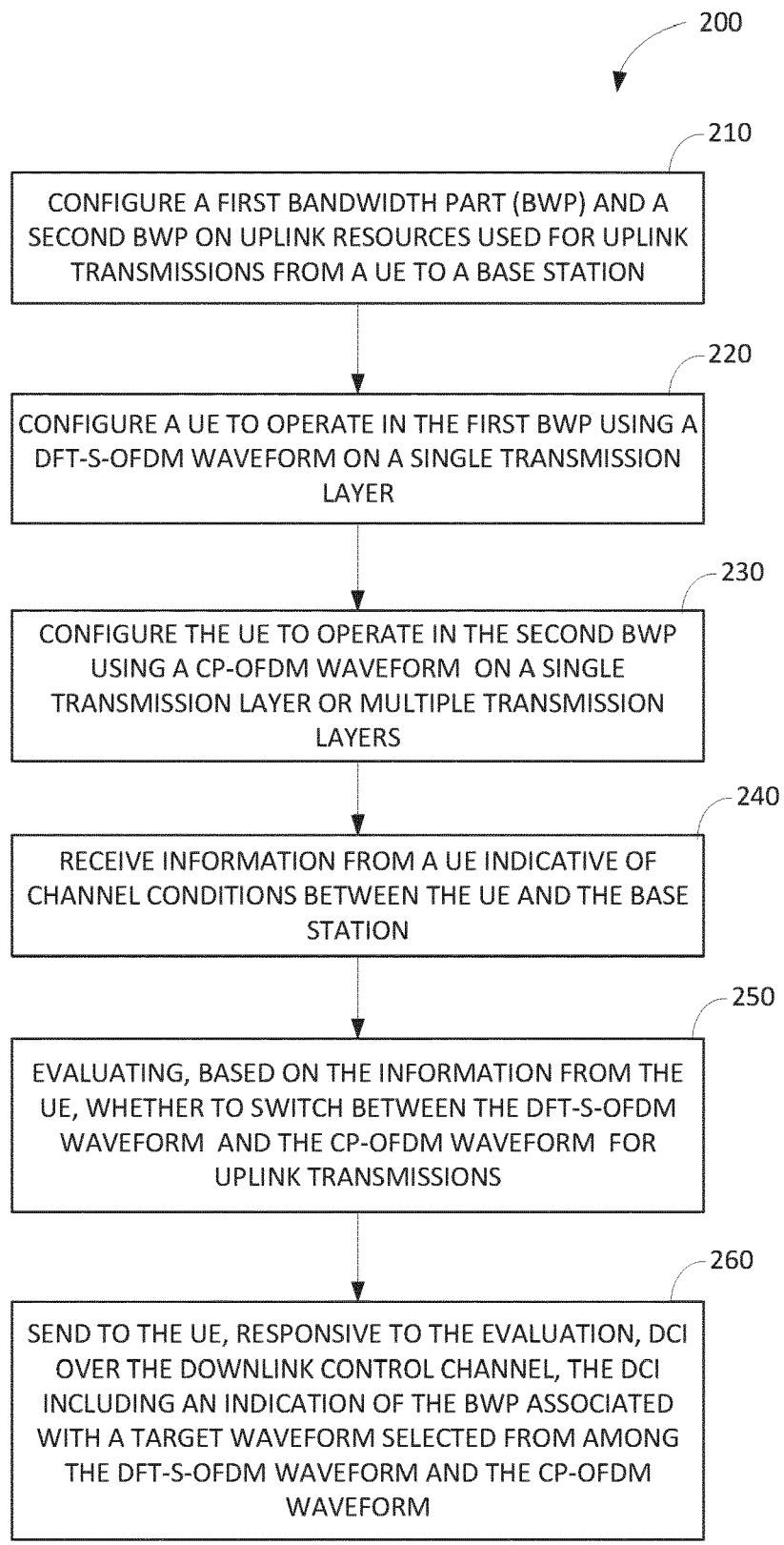
FIG. 9 illustrates an exemplary method implemented by a base station of switching waveforms using DCI-based BWP switching.

FIG. 9 illustrates another exemplary method 200 implemented by the base station 20 of switching waveforms for UL transmissions from a UE 50 capable of multi-layer transmission. The base station 20 configures a first bandwidth part (BWP) and a second BWP on UL resources used for UL transmissions from a UE 50 to a base station 20 (block 210). The base station 20 configures a UE 50 to operate in the first BWP using a DFT-S-OFDM waveform on a single transmission layer, and to operate in the second BWP using a CP-OFDM waveform on a single transmission layer or multiple transmission layers (blocks 220, 230). After configuring the UE 50, the base station 20 receives information from a UE 50 indicative of channel conditions between the UE 50 and the base station 20 (block 240). The base station 20 evaluates, based on the information from the UE 50, whether to switch between the DFT-S-OFDM waveform and the CP-OFDM waveform for UL transmissions (block 250). If it is determined that a change in waveform is needed, the base station 20 sends to the UE 50, responsive to the evaluation, DCI over the DL control channel (block 260). The DCI including an indication of the BWP associated with a target waveform selected from among the DFT-S-OFDM waveform and the CP-OFDM waveform.

In some embodiments of the method 200, receiving information from a UE 50 indicative of channel conditions between the UE 50 and the base station 20 comprises receiving, for each of the two or more time instances, information from a UE 50 indicative of channel conditions between the UE 50 and the base station 20 at each of the successive time instances.

In some embodiments of the method 200, evaluating whether to switch between the DFT-S-OFDM waveform and the CP-OFDM waveform for uplink transmissions comprises, for each of the two or more time instances, determining whether the information indicates a need for a change of a current waveform, maintaining a first count of time instances where the information indicates a need for a change of the current waveform, and determining, depending on the first count, whether to switch between the DFT-S-OFDM waveform and the CP-OFDM waveform.

In some embodiments of the method 200, the first count is of a number of consecutive time instances where the information indicates a need for a change of the current waveform.

In some embodiments of the method 200, switching between the DFT-S-OFDM waveform and the CP-OFDM waveform comprises switching waveforms when the first count reaches a threshold.

In some embodiments of the method 200, switching between the DFT-S-OFDM waveform and the CP-OFDM waveform when the first count reaches a threshold comprises switching from the DFT-S-OFDM waveform to the CP-OFDM waveform when the first count reaches a first threshold, and switching from the CP-OFDM waveform to DFT-S-OFDM waveform when the first count reaches a second threshold less than the first threshold.

In some embodiments of the method 200, switching between the DFT-S-OFDM waveform and the CP-OFDM waveform comprises switching modulation waveforms when the first count reaches a threshold within a time window.

Some embodiments of the method 200 further comprise initializing a timer to measure a duration of the time window and running the timer responsive to the receipt of information indicating a need for a change of the current waveform.

Some embodiments of the method 200 further comprise resetting the timer responsive to expiration of the timer, or receipt of information indicating no change of the current waveform.

Some embodiments of the method 200 further comprise resetting the first count responsive to expiration of the timer.

Some embodiments of the method 200 further comprise maintaining a second count of time instances where the information indicates no need for a change of the current waveform.

In some embodiments of the method 200, switching between the DFT-S-OFDM waveform and the CP-OFDM waveform further depends on the second count.

In some embodiments of the method 200, switching between the DFT-S-OFDM waveform and the CP-OFDM waveform depends on a comparison of the first count and the second count.

In some embodiments of the method 200, the information from which channel conditions is determined comprises at least one of channel state information indicative of downlink channel conditions, sounding reference signals.

Some embodiments of the method 200 further comprise receiving power headroom of the UE 50 and evaluating whether to switch waveforms further based on the power headroom of the UE 50.

Some embodiments of the method 200 further comprise receiving at least one of battery status information, a power preference indication or a temperature indication from the UE and evaluating whether to switch waveforms further based on at least one of the battery status information, power preference indication or temperature indication.

Figure 10:
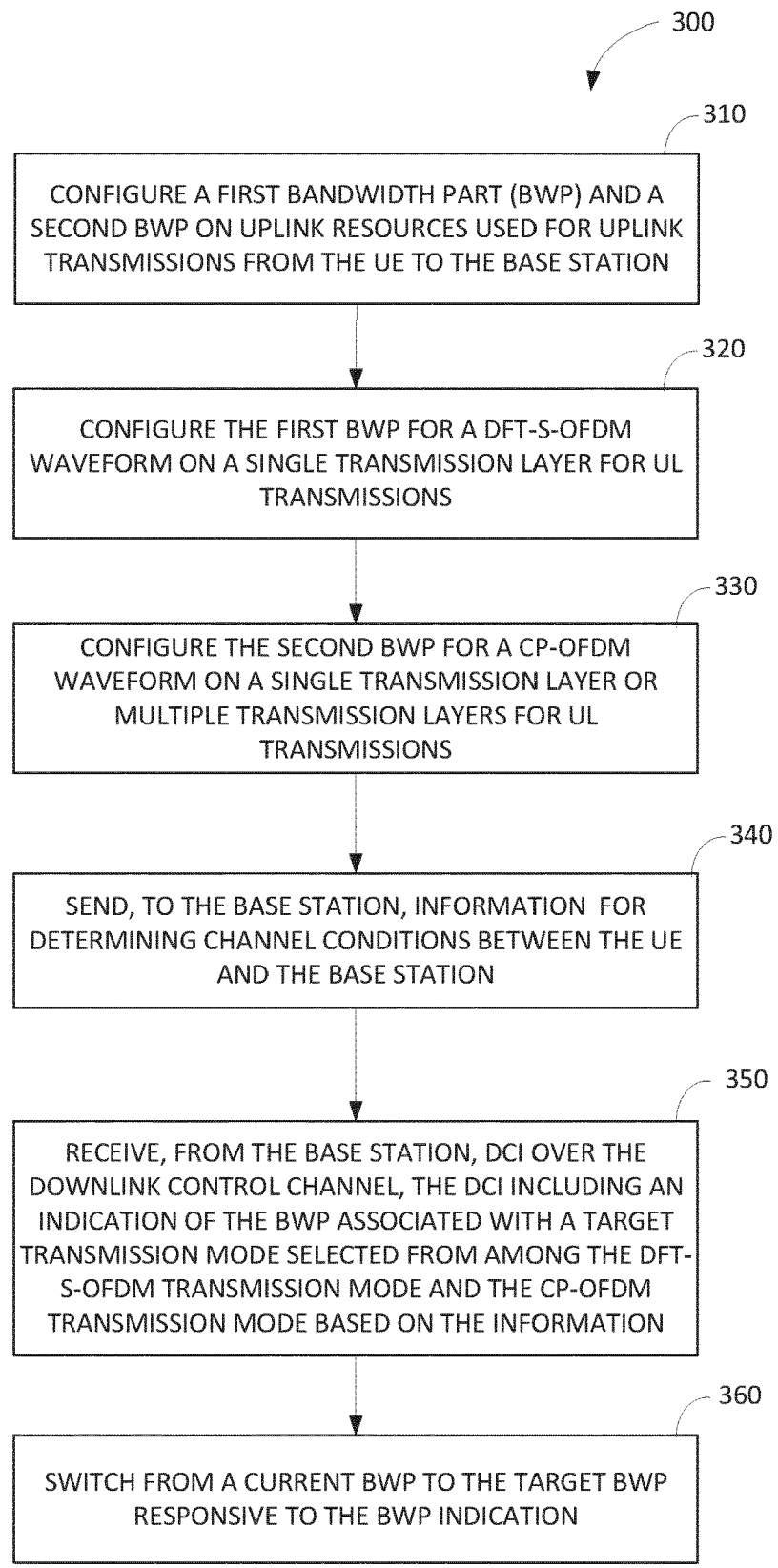
FIG. 10 illustrates an exemplary method implemented by a UE of switching waveforms using DCI-based BWP switching.

FIG. 10 illustrates an exemplary method 300 implemented by a UE 50 capable of multi-layer transmission in a wireless communication network of switching waveforms for UL transmissions to a base station 20. The UE 50 configures a first bandwidth part (BWP) and a second BWP on UL resources used for UL transmissions from the UE 50 to a base station 20 (block 310). The UE 50 configures the first BWP for a DFT-S-OFDM waveform on a single transmission layer for UL transmissions and configures the second BWP for a CP-OFDM waveform on a single transmission layer or multiple transmission layers for UL transmissions (blocks 320, 330). The UE 50 further sends, to a base station 20, information from which channel conditions between the UE 50 and the base station 20 can be determined (block 340). The UE 50 thereafter receives, from the base station 20, DCI over the DL control channel (block 350). The DCI includes an indication of the BWP associated with a target waveform selected from among the DFT-S-OFDM waveform and the CP-OFDM waveform based on the information. Responsive to the BWP indication, the UE 50 switches from a current BWP to the target BWP (block 360).

In some embodiments of the method 200, sending information to the base station 20 from which channel conditions between the UE 50 and the base station 20 can be determined comprises sending channel state information indicative of downlink channel conditions.

In some embodiments of the method 200, sending information to the base station 20 from which channel conditions between the UE 50 and the base station 20 can be determined comprises sending sounding reference signals to the base station.

Some embodiments of the method 300 further comprise sending power headroom information to the base station 20.

Some embodiments of the method 300 sending at least one of battery status information, a power preference indication or a temperature indication to the base station.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 11:
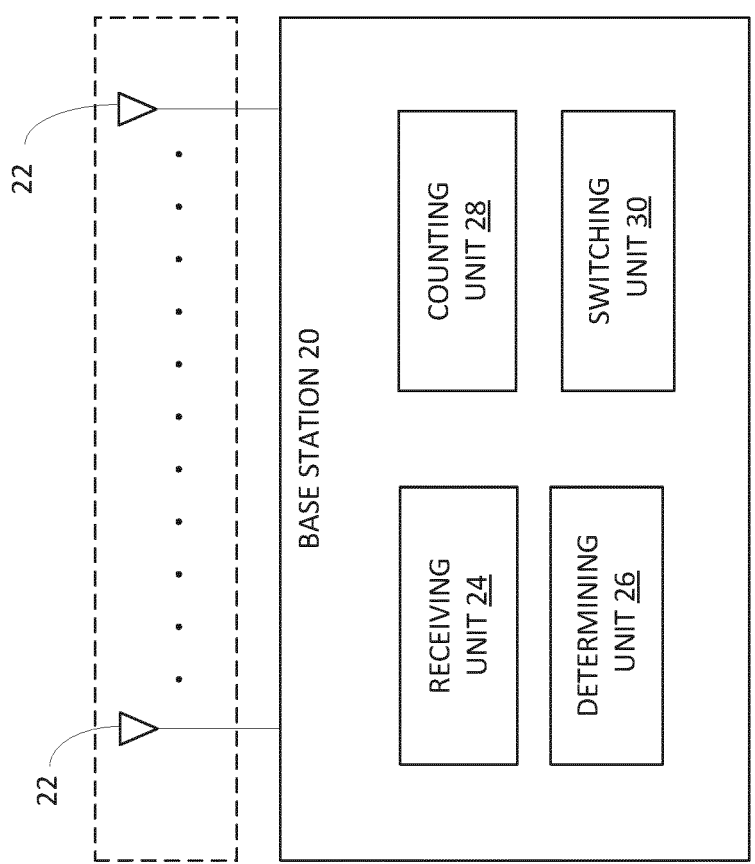
FIG. 11 illustrates an exemplary base station configured to switch between waveforms to avoid ping-ponging.

FIG. 11 illustrates a base station 20 configured to perform the method of FIG. 8. The base station 20 comprises one or more antennas 22, a receiving unit 24, a determining unit 26, a counting unit 28 and a switching unit 30. The various units 24-30 can be implemented by hardware and/or by software code that is executed by a processor or processing circuitry. The receiving unit 24 is configured to receive, at two or more successive time instances, information from a UE 50 indicative of channel conditions between the UE 50 and the base station at each of the successive time instances. The determining unit 26 is configured to, for each of the two or more time instances, determine whether the information indicates a need for a change of the current waveform for UL transmissions. The counting unit 28 is configured to maintain a first count of time instances where the information indicates a need for a change of the current waveform. The switching unit 30 is configured to switch between a DFT-S-OFDM waveform on a single transmission layer and a CP-OFDM waveform on a single transmission layer or multiple transmission layers depending on the first count.

Figure 12:
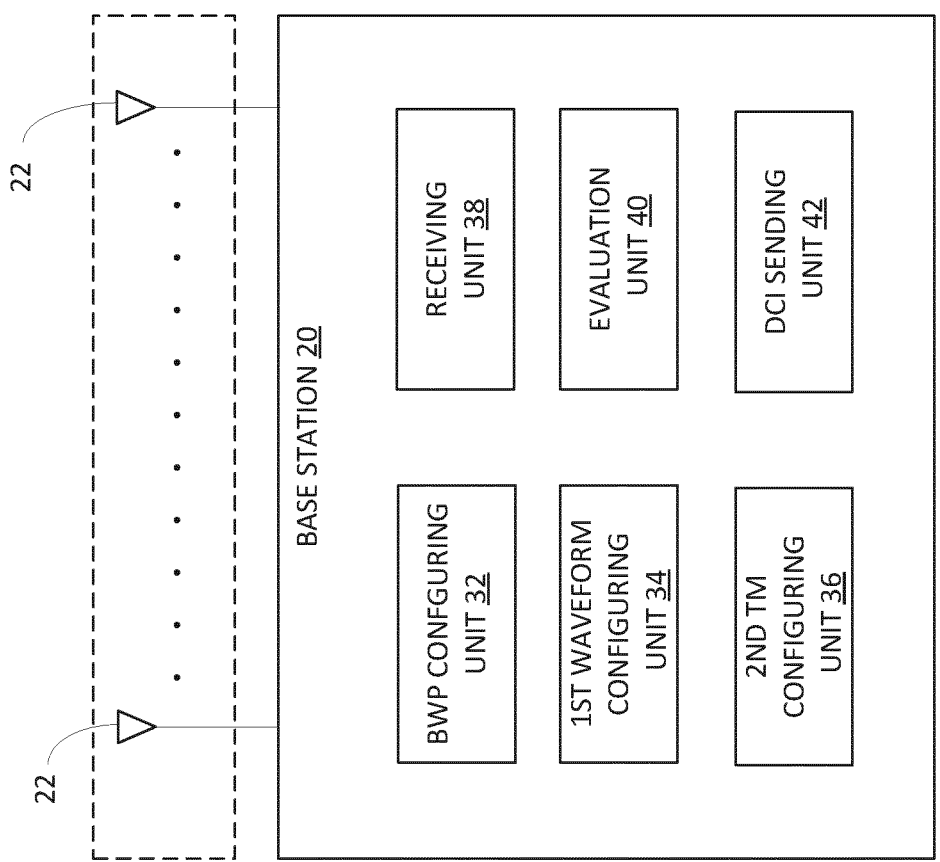
FIG. 12 illustrates an exemplary base station configured to switch waveforms using DCI-based BWP switching.

FIG. 12 illustrates a base station 20 configured to perform the method of FIG. 9. The base station 20 comprises on or more antennas 22, a BWP configuring unit 32, a first waveform configuring unit 34, a second waveform configuring unit 36, a receiving unit 38, an evaluation unit 40 and a DCI sending unit 42. The various units 32-42 can be implemented by hardware and/or by software code that is executed by a processor or processing circuitry. The BWP configuring unit 32 is configured to configure a first BWP and a second BWP on UL resources used for UL transmissions from a UE 50 to a base station 20. The first waveform configuring unit 34 is configured to configure a UE 50 to operate in the first BWP using a DFT-S-OFDM waveform on a single transmission layer. The second waveform configuring unit 36 is configured to configure the UE 50 to operate in the second BWP using a CP-OFDM waveform on a single transmission layer or multiple transmission layers. The receiving unit 38 is configured to receive information from a UE indicative of channel conditions between the UE and the base station. The evaluation unit 40 is configured to evaluate, based on the information from the UE 50, whether to switch between the DFT-S-OFDM waveform and the CP-OFDM waveform for UL transmissions. The DCI configuring unit 42 is configured to send to the UE 50, responsive to the evaluation, DCI over the DL control channel. The DCI includes an indication of the BWP associated with a target waveform selected from among the DFT-S-OFDM waveform and the CP-OFDM waveform.

Figure 13:
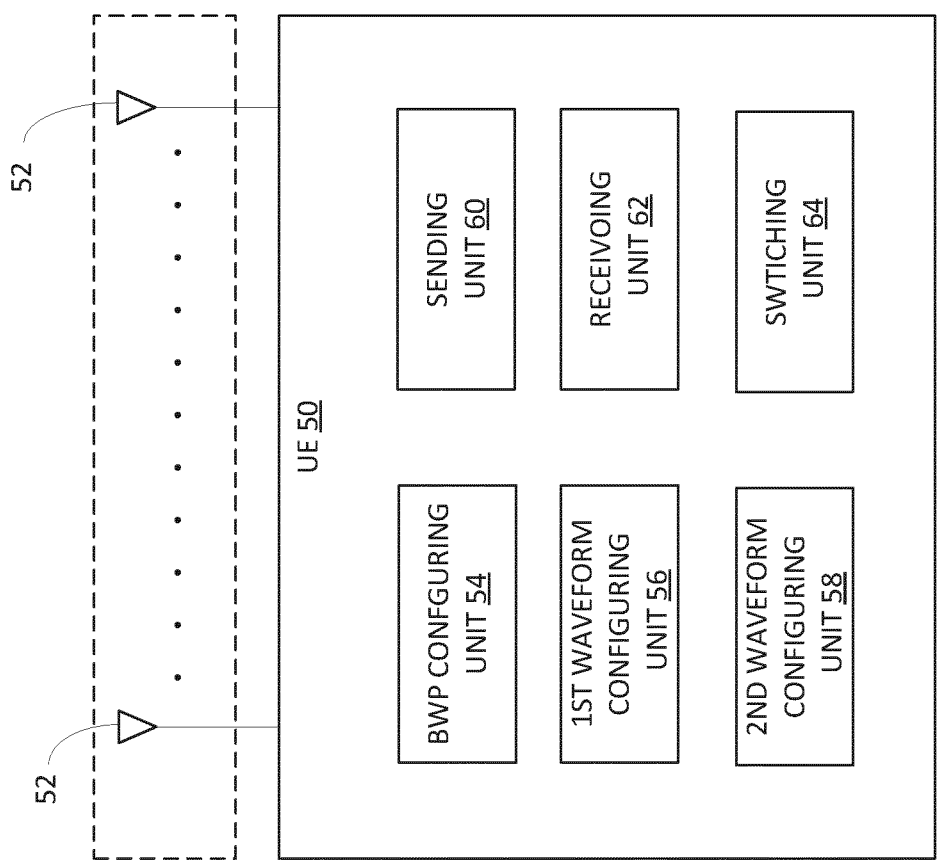
FIG. 13 illustrates an exemplary UE configured to switch waveforms using DCI-based BWP switching.

FIG. 13 illustrates a UE 50 in accordance with one or more embodiments. The UE 50 comprises one or more antennas 52, a BWP configuring unit 54, a first waveform configuring unit 56, a second waveform configuring unit 58, a sending unit 60, a receiving unit 62, and a switching unit 64. The various units 54-64 can be implemented by hardware and/or by software code that is executed by one or more processors or processing circuitry. The BWP configuring unit 54 configures a first bandwidth part (BWP) and a second BWP on UL resources used for UL transmissions from the UE 50 to a base station 20. The first waveform configuring unit 56 configuring the first BWP for a DFT-S-OFDM waveform using a single transmission layer. The second waveform configuring unit 58 configuring the second BWP for a CP-OFDM waveform on a single transmission layer or multiple transmissions layers. The sending unit 60 is configured to send, to a base station, information from which channel conditions between the UE 50 and the base station can be determined. The receiving unit 62 is configured receive, from the base station, DCI over the DL control channel, The DCI including an indication of the BWP associated with a target waveform selected from among the DFT-S-OFDM waveform and the CP-OFDM waveform based on the information. The switching unit 64 is configured to switching from a current BWP to the target BWP responsive to the BWP indication.

Figure 14:
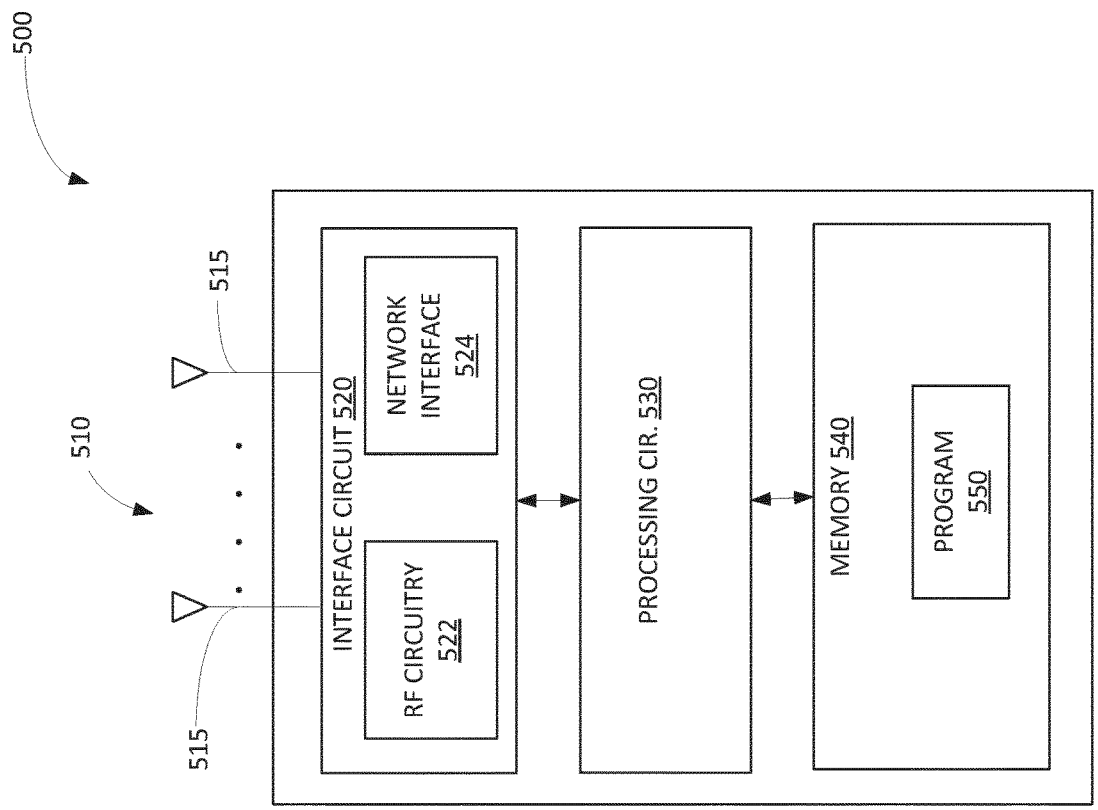
FIG. 14 illustrates an exemplary base station according to another embodiment.

FIG. 14 illustrates a base station 500 according to one embodiment that may be configured to perform the methods as herein described including the methods of FIGS. 8 and 9. The base station 500 comprises an antenna array 510 with multiple antenna elements 515, an interface circuit 520, a processing circuitry 530, and memory 540. The interface circuit 520 is coupled to the antennas 515 and comprises the radio frequency (RF) circuitry 522 needed for transmitting and receiving signals over a wireless communication channel. In one embodiment, the interface circuit 520 comprises a RF transceiver including a transmitter and receiver configured to operate according to the NR standard. The interface circuit 520 further comprises a network interface 524 to communication over wired or wireless links with other network nodes.

The processing circuitry 530 controls the overall operation of the radio node 500 and processes the signals transmitted to or received by the radio node 500. Such processing includes coding and modulation of transmitted data signals, and the demodulation and decoding of received data signals. The processing circuitry 530 may comprise one or more microprocessors, hardware, firmware, or a combination thereof. Memory 540 comprises both volatile and non-volatile memory for storing computer program code and data needed by the processing circuitry 530 for operation. Memory 540 may comprise any tangible, non-transitory computer-readable storage medium for storing data including electronic, magnetic, optical, electromagnetic, or semiconductor data storage. Memory 540 stores a computer program 550 comprising executable instructions that configure the processing circuitry 530 to implement the methods one or more of the methods 100 and 200 according to FIGS. 8 and 9 respectively. A computer program 550 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 550 for configuring the processing circuitry 530 as herein described may be stored in a removable memory, such as a portable compact disc, portable digital video disc, or other removable media. The computer program 550 may also be embodied in a carrier such as an electronic signal, optical signal, radio signal, or computer readable storage medium.

Figure 15:
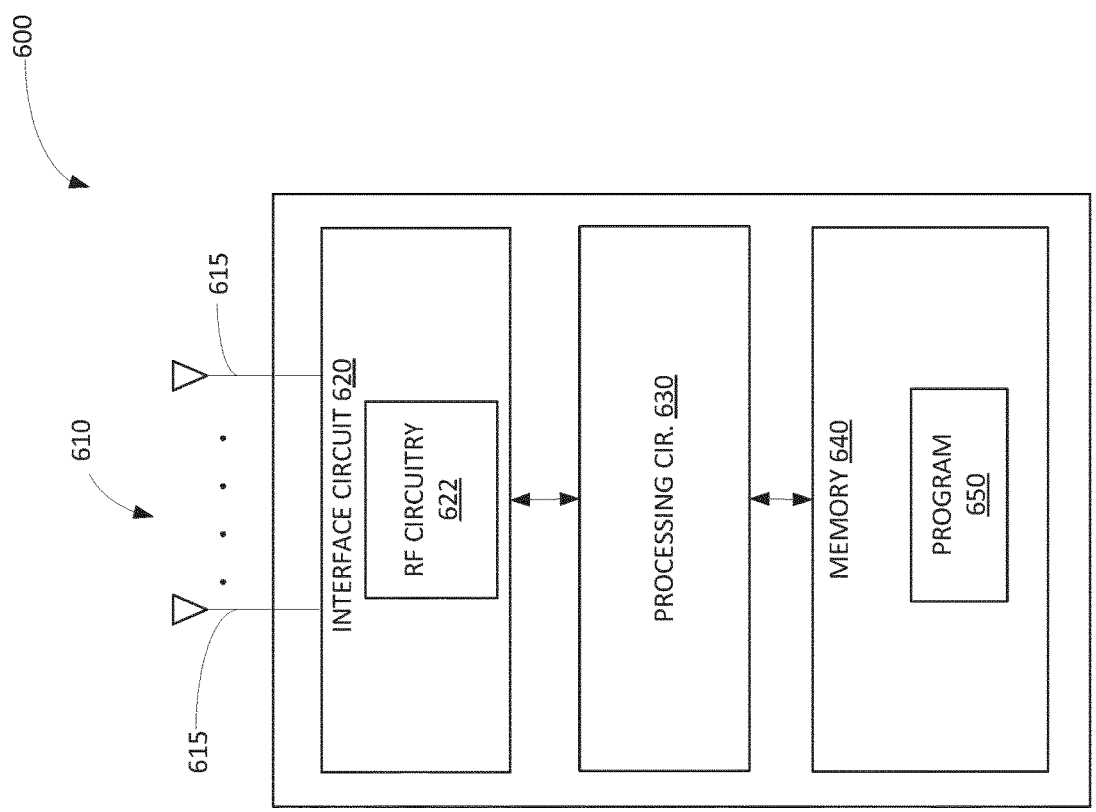
FIG. 15 illustrates an exemplary UE according to another embodiment.

FIG. 15 illustrates a UE 600 according to one embodiment that may be configured to perform the methods as herein described including the methods of FIGS. 8 and 9. The UE 600 comprises an antenna array 610 with multiple antenna elements 616, an interface circuit 620, a processing circuitry 630, and memory 640. The interface circuit 620 is coupled to the antennas 616 and comprises the radio frequency (RF) circuitry 622 needed for transmitting and receiving signals over a wireless communication channel. In one embodiment, the interface comprises a RF transceiver including a transmitter and receiver configured to operate according to the NR standard.

The processing circuitry 630 controls the overall operation of the radio node 600 and processes the signals transmitted to or received by the radio node 600. Such processing includes coding and modulation of transmitted data signals, and the demodulation and decoding of received data signals. The processing circuitry 630 may comprise one or more microprocessors, hardware, firmware, or a combination thereof. Memory 640 comprises both volatile and non-volatile memory for storing computer program code and data needed by the processing circuitry 630 for operation. Memory 640 may comprise any tangible, non-transitory computer-readable storage medium for storing data including electronic, magnetic, optical, electromagnetic, or semiconductor data storage. Memory 640 stores a computer program 650 comprising executable instructions that configure the processing circuitry 630 to implement the methods one or more of the methods 100 and 200 according to FIGS. 8 and 9 respectively. A computer program 650 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 650 for configuring the processing circuitry 630 as herein described may be stored in a removable memory, such as a portable compact disc, portable digital video disc, or other removable media. The computer program 650 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The techniques as herein described avoid unnecessary switching between waveforms, which can degrade performance due to RRC reconfiguration. Additionally, techniques have been described to reduce the time delay for waveform switching using multiple BWPs configured to use different waveforms. Thus, the time delay to switch waveforms is reduced from about 30-40 msec to about 2 msec. Though described in the context of NR networks, the techniques can be adapted for other standards.

Additional information may be found in Appendix A, which is incorporated in its entirety by reference.

The invention claimed is:

1. A method, implemented by a base station in a wireless communication network, of switching waveforms for uplink transmissions from a User Equipment (UE) capable of multi-layer transmission, the method comprising:
   receiving, at two or more successive time instances, information from a UE indicative of channel conditions between the UE and the base station at each of the successive time instances;
   for each of the two or more time instances, determining whether the information indicates a need for a change of a current waveform for uplink transmissions;
   maintaining a first count of time instances where the information indicates a need for a change of the current waveform; and
   switching, depending on the first count, between a discrete Fourier transform spread orthogonal frequency division multiplexing (DFT-S-OFDM) waveform configured for a single transmission layer and a cyclic prefix orthogonal frequency division multiplexing (CP-OFDM) waveform configured for a single transmission layer or multiple transmission layers.

2. The method of claim 1, wherein the first count is of a number of consecutive time instances where the information indicates a need for a change of the current waveform.

3. The method of claim 1, wherein switching between the DFT-S-OFDM waveform and the CP-OFDM waveform comprises switching waveforms when the first count reaches a threshold.

4. The method of claim 3, wherein switching between the DFT-S-OFDM waveform and the CP-OFDM waveform when the first count reaches a threshold comprises:
   switching from the DFT-S-OFDM waveform to the CP-OFDM waveform when the first count reaches a first threshold; and
   switching from the CP-OFDM waveform to DFT-S-OFDM waveform when the first count reaches a second threshold less than the first threshold.

5. The method of claim 1, wherein switching between the DFT-S-OFDM waveform and the CP-OFDM waveform comprises switching modulation waveforms when the first count reaches a threshold within a time window.

6. The method of claim 5, further comprising:
   initializing a timer to measure a duration of the time window; and
   running the timer responsive to the receipt of information indicating a need for a change of the current waveform.

7. The method of claim 6, further comprising resetting the timer responsive to:
   expiration of the timer; or
   receipt of information indicating no change of the current waveform.

8. The method of claim 6, further comprising resetting the first count responsive to expiration of the timer.

9. The method of claim 1, further comprising maintaining a second count of time instances where the information indicates no need for a change of the current waveform.

10. The method of claim 9, wherein switching between the DFT-S-OFDM waveform and the CP-OFDM waveform further depends on the second count.

11. The method of claim 10, wherein switching between the DFT-S-OFDM waveform and the CP-OFDM waveform depends on a comparison of the first count and the second count.

12. The method of claim 1, wherein switching between a DFT-S-OFDM waveform configured for a single transmission layer and a CP-OFDM waveform configured for a single transmission layer or multiple transmission layers comprises:
   performing Bandwidth Part (BWP) switching when BWPs are configured for waveform switching; and
   performing a Radio Resource Control (RRC) reconfiguration when BWPs are not configured for waveform switching.

13. The method of claim 1, wherein switching between a DFT-S-OFDM waveform configured for a single transmission layer and a CP-OFDM waveform configured for a single transmission layer or multiple transmission layers comprises:
   performing a Radio Resource Control (RRC) reconfiguration when no data exchange requiring a resource assignment is expected within a predetermined time period; and
   performing Bandwidth Part (BWP) switching when a data exchange requiring a resource assignment is expected within a predetermined time period.

14. A method, implemented by a User Equipment (UE) in a wireless communication network, of switching waveforms for uplink transmissions, the method comprising:
   configuring a first bandwidth part (BWP) and a second BWP on uplink resources used for uplink transmissions from the UE to a base station;
   configuring the first BWP for a discrete Fourier transform spread orthogonal frequency division multiplexing (DFT-S-OFDM) waveform on a single transmission layer for UL transmissions;
   configuring the second BWP for a cyclic prefix orthogonal frequency division multiplexing (CP-OFDM) waveform on a single transmission layer or multiple transmission layers for UL transmissions;
   sending, to a base station, information from which channel conditions between the UE and the base station can be determined;
   receiving, from the base station, downlink control information over the downlink control channel, the DCI including an indication of the BWP associated with a target waveform selected from among the DFT-S-OFDM waveform and the CP-OFDM waveform based on the information; and switching from a current BWP to the target BWP responsive to the BWP indication.

15. The method of claim 14, wherein sending, to the base station, information from which channel conditions between the UE and the base station can be determined comprises sending channel state information indicative of downlink channel conditions.

16. The method of claim 14, wherein sending, to the base station, information from which channel conditions between the UE and the base station can be determined comprises sending sounding reference signals to the base station.

17. The method claim 14, further comprising sending power headroom information to the base station.

18. The method of claim 14, further comprising sending battery status information, a power preference indication, and/or a temperature indication to the base station.

19. A base station in a wireless communication network configured to switch waveforms for uplink transmissions from a User Equipment (UE), the base station comprising:

interface circuitry for communicating with a UE over a wireless communication channel; and processing circuitry configured to:

receive, at two or more successive time instances, information from a UE indicative of channel conditions between the UE and the base station at each of the successive time instances;

for each of the two or more time instances, determine whether the information indicates a need for a change of a current waveform for uplink transmissions;

maintain a first count of time instances where the information indicates a need for a change of the current waveform; and switch, depending on the first count, between a discrete Fourier transform spread orthogonal frequency division multiplexing (DFT-S-OFDM) waveform configured for a single transmission layer and a cyclic prefix orthogonal frequency division multiplexing (CP-OFDM) waveform configured for a single transmission layer or multiple transmission layers.

20. A user equipment (UE) in a wireless communication network, the UE comprising:

interface circuitry configured to communicate with a base station over a wireless communication channel; and processing circuitry configured to:

configure a first bandwidth part (BWP) and a second BWP on uplink resources used for uplink transmissions from the UE to a base station;

configure the first BWP for a discrete Fourier transform spread orthogonal frequency division multiplexing (DFT-S-OFDM) waveform on a single transmission layer for UL transmissions;

configure the second BWP for a cyclic prefix orthogonal frequency division multiplexing (CP-OFDM) waveform on a single transmission layer or multiple transmission layers for UL transmissions;

send, to a base station, information from which channel conditions between the UE and the base station can be determined;

receive, from the base station, downlink control information over the downlink control channel, the DCI including an indication of the BWP associated with a target waveform selected from among the DFT-S-OFDM waveform and the CP-OFDM waveform based on the information; and switch from a current BWP to the target BWP responsive to the BWP indication.

* * * * *